United States Patent [19]

Mercer

[11] Patent Number: 4,781,610

[45] Date of Patent: Nov. 1, 1988

[54] VOLTAGE SELECTOR FOR A THREE PHASE ELECTRICAL MOTOR

[76] Inventor: John L. Mercer, c/o B. & M. Electric Company, 615 East Main St., Springfield, Ohio 45503

[21] Appl. No.: 78,143

[22] Filed: Jul. 27, 1987

[51] Int. Cl.[4] ...................... H01R 27/00; H02K 11/00
[52] U.S. Cl. ................................. 439/217; 310/68 C; 310/71; 439/222
[58] Field of Search ............... 310/71, 68 C, 180, 184; 439/166, 167, 170–173, 217, 218, 221, 222, 224, 516, 723, 908

[56] References Cited

U.S. PATENT DOCUMENTS

| | | | |
|---|---|---|---|
| 2,874,317 | 2/1959 | Couse | 310/71 |
| 2,922,054 | 1/1960 | Miller | 310/71 |
| 3,231,767 | 1/1966 | Powell | 310/71 |
| 3,629,789 | 12/1971 | Szeremy | 439/222 |
| 4,394,549 | 7/1983 | Dennis | 200/16 E |
| 4,429,935 | 2/1984 | Lamb et al. | 339/32 M |
| 4,547,689 | 10/1985 | Tsuchimoto et al. | 310/71 |
| 4,609,244 | 9/1986 | Buscher et al. | 439/217 |
| 4,740,167 | 4/1988 | Millhimes et al. | 439/222 |
| 4,748,355 | 5/1988 | Anderson et al. | 310/71 |

FOREIGN PATENT DOCUMENTS

| | | | |
|---|---|---|---|
| 0270724 | 9/1962 | Australia | 439/171 |
| 0221039 | 4/1985 | German Democratic Rep. | 439/222 |

*Primary Examiner*—Gil Weidenfeld
*Assistant Examiner*—Paula A. Austin
*Attorney, Agent, or Firm*—Biebel, French & Nauman

[57] ABSTRACT

A reversible connector for applying selectively different power levels to a three phase electrical motor. Lead wires from the motor are brought out to a terminal block having an array of female terminals arranged for mating engagement with arrays of pins on opposite sides of the reversible connector. The pin arrays are setwise interconnected so that engagement with the terminal block produces appropriate connections for the selected power level. Three phase power leads are connected to the connector, and the connector is engaged with the terminal block in that facing direction which is appropriate for the power level being applied to the power leads.

20 Claims, 6 Drawing Sheets

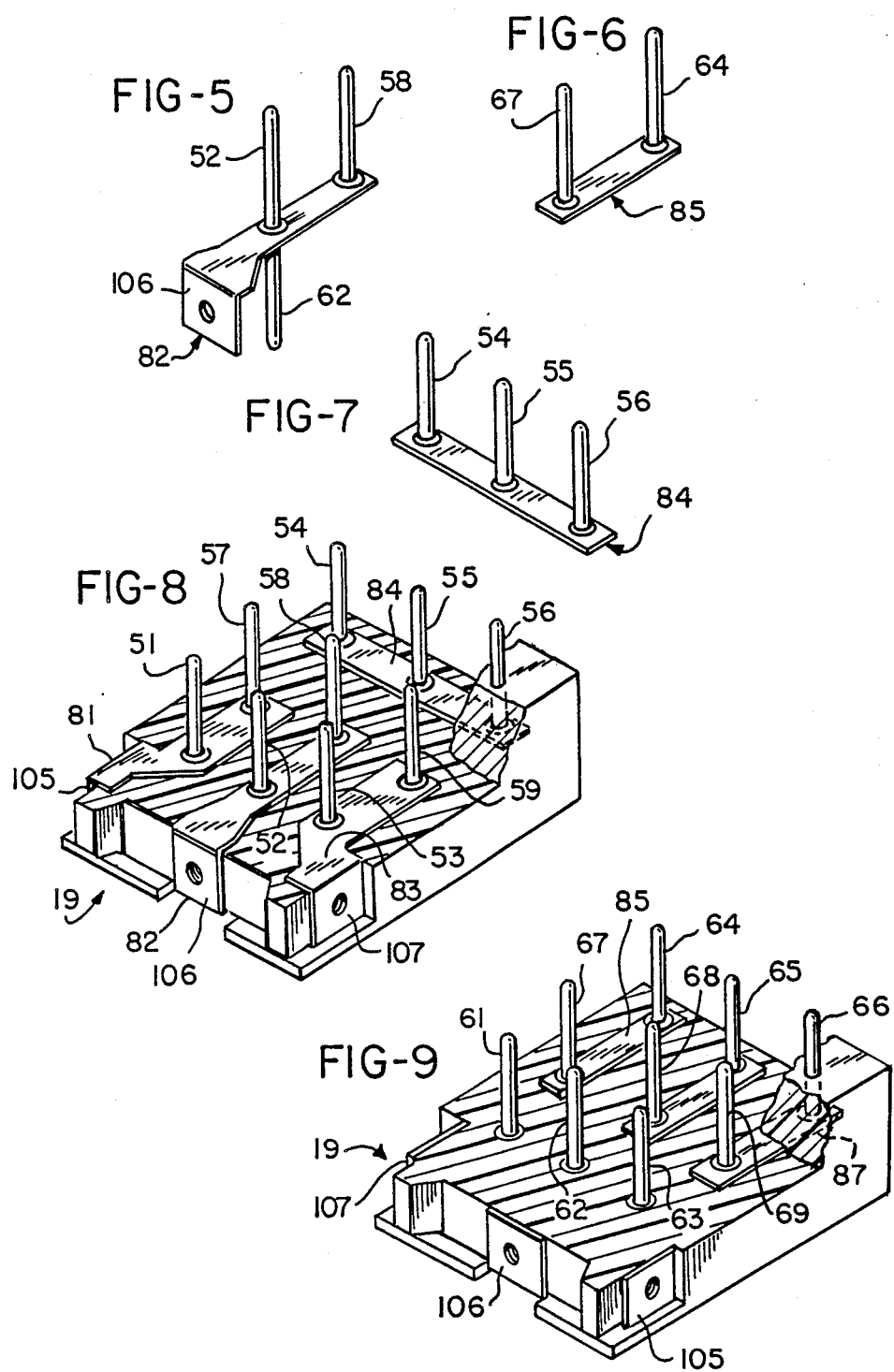

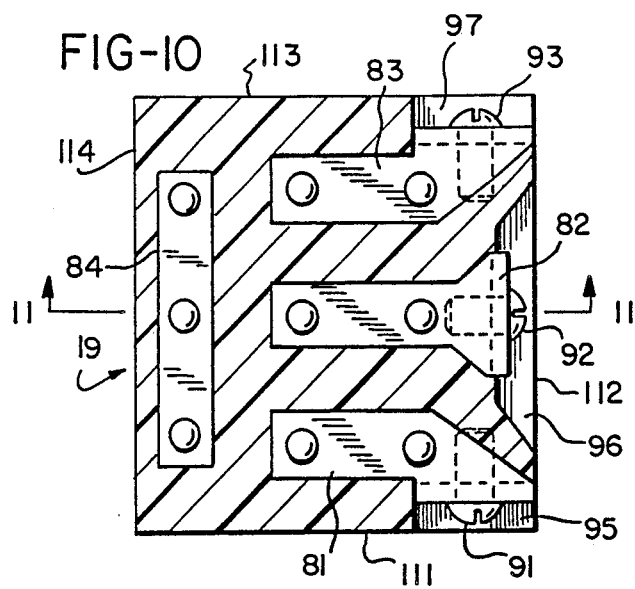
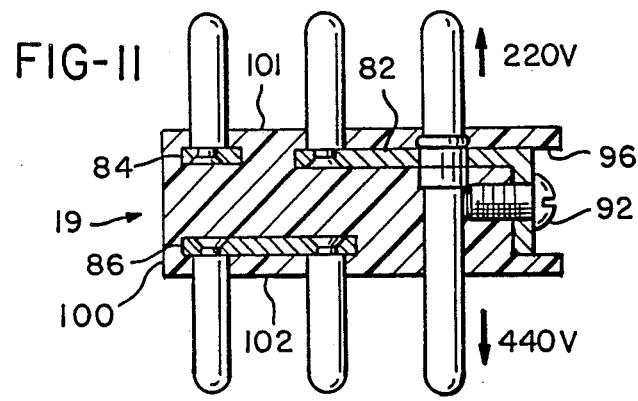

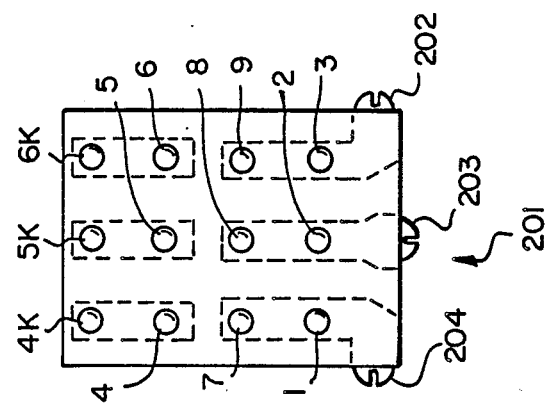
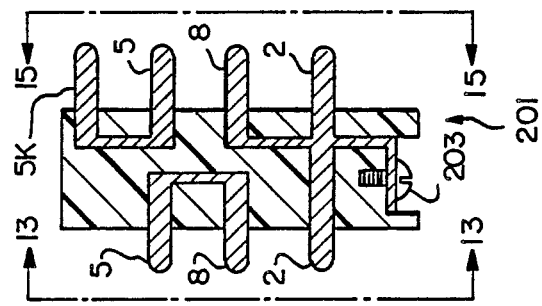
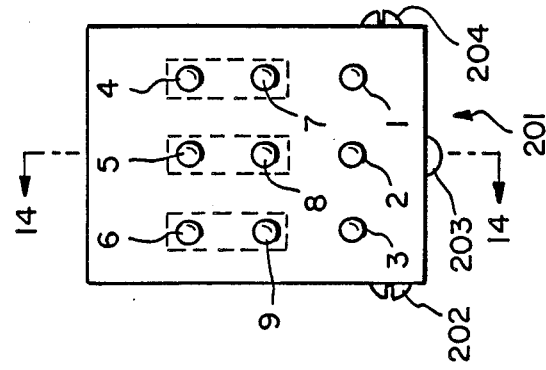

VOLTAGE SELECTOR FOR A THREE PHASE ELECTRICAL MOTOR

BACKGROUND OF THE INVENTION

This invention relates to the field of power connections for three phase electrical motors. Such electrical motors typically have six sets of field windings which are partially interconnected to define either a delta configuration or a star configuration. However, star configurations are much more common. In either case nine terminal wires extend from the motor for completion of the interconnection of the field windings. The configuration of the external connection depends upon the applied voltage. If the motor is to be powered from a 220 volt source, connections are made so as to place the six sets of field windings into three sets of parallel pairs. For a 440 volt power supply the interconnections are made to arrange the field windings into three sets of series pairs.

Heretofore the connection of a three phase electrical motor to its power supply has been carried out by hand wiring on a custom basis. This process is labor intensive and prone to error. One solution to this problem is taught in Lamb et al. U.S. Pat. No. 4,429,935. The Lamb invention provides a multi-position electrical connector. The connector includes a socket having rows of parallel receptacles and a base having rows of upstanding blades. 220 volt power and 440 volt power are supplied to the socket, and appropriate connection to the motor is made automatically depending upon the position of the base relative to the socket. The arrangement affords a quick power change and appears to have utility in applications where such power changes are frequently required and space is not limited. However, the arrangement is complicated, large and expensive. There is a need for a simple, compact and inexpensive connector for the broad range of three phase electrical motors which are normally set to receive power at a specific voltage and which require infrequent changing thereafter.

SUMMARY OF THE INVENTION

This invention provides improved means for applying electrical power to a three phase motor of the type having six partially interconnected field windings and at least nine terminal wires extending therefrom. In accordance with one aspect of the invention the nine terminal wires are attached to an array of nine female terminals incorporated within a terminal block mounted on the motor. Power is supplied to the terminal block by a reversible connector comprising an insulating base having oppositely disposed first and second faces. First and second sets of contact pins are partially encapsulated within the base and project from the first and second faces respectively for selective engagement with the array of female terminals. The pins in the two sets are setwise interconnected as appropriate for application of two different voltage levels to the motor. Thus engagement of the pins in one set causes the six field windings to become arranged in three parallel pairs, while engagement of the pins in the other set causes the field windings to become arranged in three sets of series pairs.

In another aspect the invention contemplates a reversible power connector configured as above described and with three pins in each set being connected to and in alignment with corresponding pins in the other set for operation as power delivery terminals for a three phase electric motor. These power delivery terminals may be connected to power connectors mounted upon the insulating base.

Accordingly it is an object of the invention to provide improved means for selectively applying three phase power to an electric motor at either of two different voltage levels. Other and further objects and advantages of the invention will be apparent from the following description, the accompanying drawings and the appended claims.

BRIEF DESCRIPTION OF THE DRAWINGS

FIGS. 5–7 illustrate terminal pin assemblies of three different types.

FIG. 8 is an illustration of a reversible connector, partially cut away to show connections for application of 220 volt power to a three phase motor.

FIG. 9 is an illustration of a reversible connector, partially cut away to show interconnections for applying 440 volt power to a three phase electric motor.

FIG. 10 is a sectioned plan view of a reversible connector as seen from the 220 volt side.

FIG. 11 is a side elevation view of a reversible connector taken along lines 11—11 of FIG. 10.

FIG. 13 is a plan view of a reversible connector in an alternative embodiment as seen from the 440 volt side.

FIG. 14 is a cross-sectional view shown in side elevation of the reversible connector of FIG. 13.

FIG. 15 is a plan view of the reversible connector of FIG. 13 as seen from the 220 volt side.

DESCRIPTION OF THE PREFERRED EMBODIMENT

Improved voltage selection means for a three phase electric motor may be configured as illustrated in FIGS. 3–11 for star connected motors. Appropriate modifications are easily made for applying the invention to a three phase delta conntected motor. The invention is also applicable to a three phase star connected electric motor equipped with an overload circuit.

Figure 1:
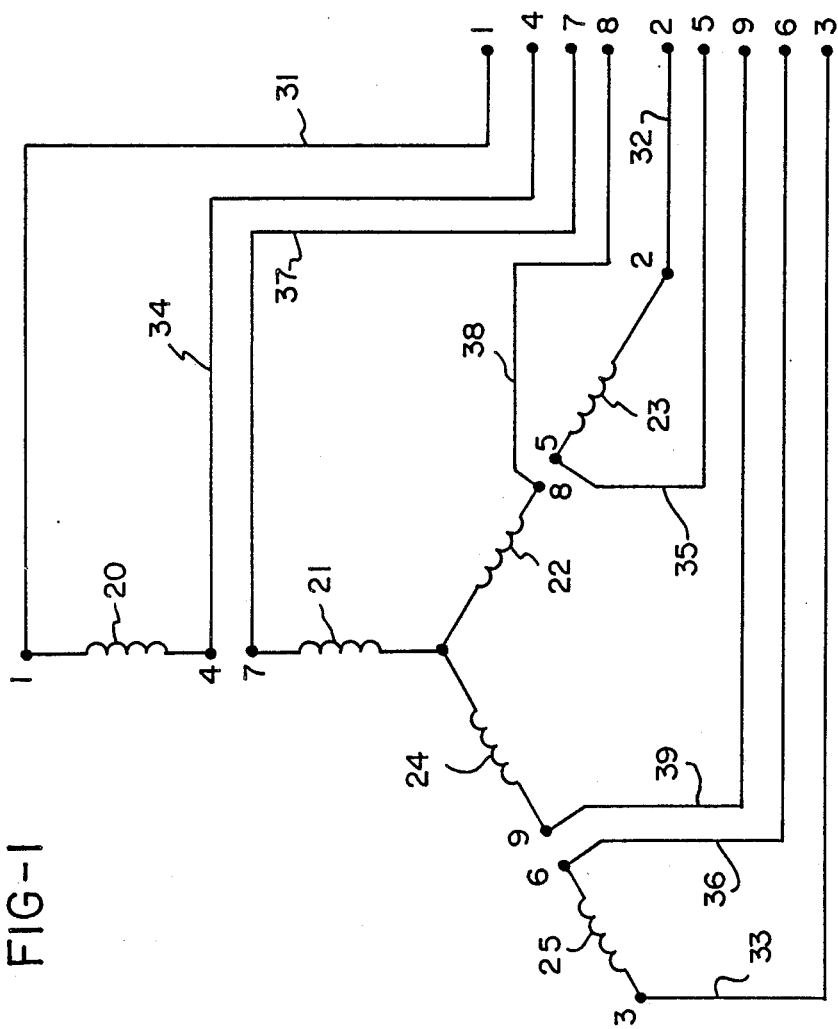
FIG. 1 is a schematic illustration of field windings for a three phase motor arranged in a star configuration.

A typical three phase motor may have six field windings 20–25, star connected as illustrated in FIG. 1. As produced by a motor manufacturer, three windings 21, 22, 24 are tied together at one end. The other ends of those three connectors are attached to lead wires commonly designated as lead wire nos. 7, 8, 9. Field windings 20, 23, 25 have lead wires connected to both ends. These lead wires are commonly given the designations 1, 2, 3, 4, 5 and 6. When such an electric motor is to be operated from a 220 volt power supply, lead wires 1 and 7 (designated by reference numerals 31 and 37 in FIG. 1) are interconnected to place field windings 20, 21 in parallel. Likewise field windings 22, 23 and 24, 25 are arranged as parallel pairs. The interconnections create two parallel stars (the centerpoints being electric nulls and not being joined). For connection to a 440 volt power supply, winding 20 is placed in series with winding 21, winding 22 is placed in series with winding 23, and winding 24 is placed in series with winding 25. Tables I and II below summarize the standard, well known connections for 220 volts and 440 volts respectively. In both tables the designation P indicates a power connection.

TABLE I

| (220 v) |
|---|
| 1-7-P |
| 2-8-P |
| 3-9-P |
| 4-5-6 |

TABLE II

| (440v) |
|---|
| 1-P |
| 2-P |
| 3-P |
| 4-7 |
| 5-8 |
| 6-9 |

Figure 2:
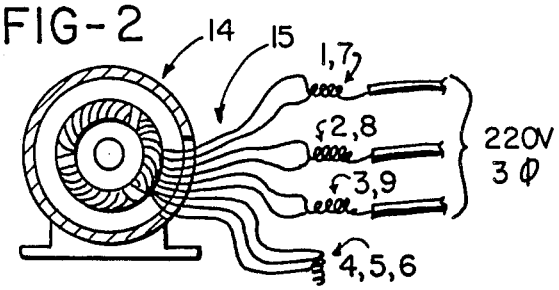
FIG. 2 is an illustration of a prior art technique for connecting a three phase motor to a 220 volt power supply, by hand wiring on a custom basis.

In a typical prior art arrangement, as illustrated in FIG. 2, lines 31 through 39 are brought from motor 14 as a wire bundle 15. Wire connections are made by hand in accordance with Table I. Three pairs of wires are attached to a 220 volt power supply, and the remaining three wires are simply joined and thereafter stuffed back into the motor housing or into a connection box. For 440 volts, wire connections have been made by hand in accordance with Table II. Three individual wires (1,2, and 3) have been connected to the 440 volt power supply, and the remaining three pairs (4 and 7, 5 and 8, 6 and 9) have been simply joined in pairs and thereafter stuffed into the motor housing or connection box.

Figure 3:
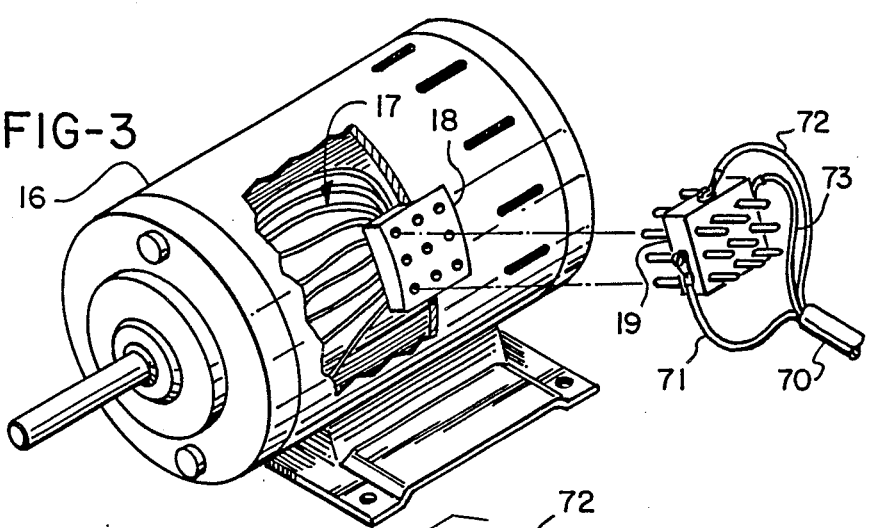
FIG. 3 is a pictorial illustration of a connection of a three phase motor to a power supply in accordance with the present invention.

In the present invention, as illustrated in FIG. 3, a wire bundle 17 from motor 16 is brought out to a terminal block 18 mounted on the motor housing. Power leads 71, 72, 73 from a power cable 70 are attached to a reversible connector 19. Connector 19 has two sets of opposed contact pins, both of which are arranged for engagement by terminal block 18. One set of pins is interconnected for 220 volt operation while the other set of pins is interconnected for 440 volt operation. If it is desired to change from one power level to another, connector 19 is disconnected, reversed and re-engaged with terminal block 18. The spacing between the contact pins (and likewise the spacing between the female terminals on terminal block 18) is adjusted so as to permit only a single orientation of each face of connector 19 relative to terminal block 18.

Figure 4:
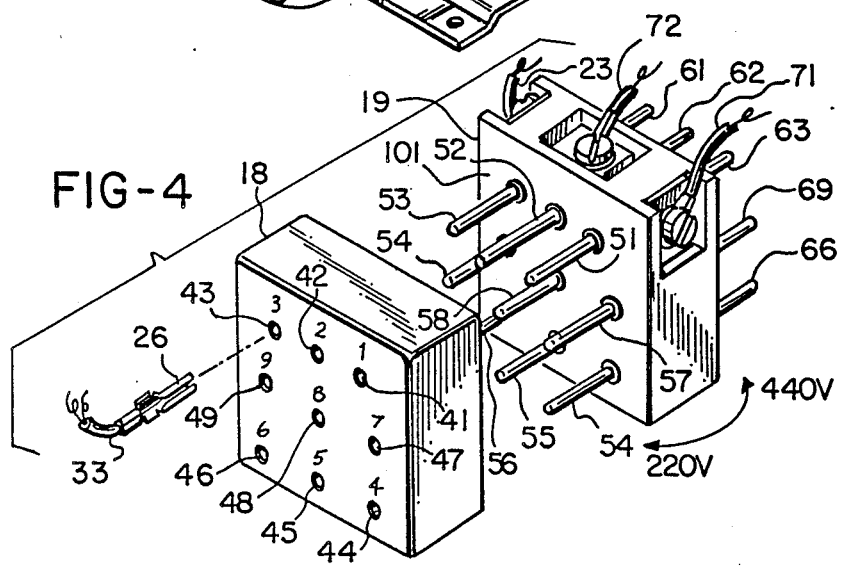
FIG. 4 is an enlarged illustration of the engagement relation between a terminal block and a reversible connector.

The engagement relationship between connector 19 and terminal block 18 is illustrated in greater detail in FIG. 4. As shown therein terminal block 18 may have nine apertures 41 through 49 corresponding to the nine standard terminal designations 1-9. Apertures 41 through 49 receive nine female terminals crimped upon lead wires 31 through 39 respectively (only lead wire 33 being illustrated in FIG. 4). Terminal block 18 may be fabricated from an insulating material such as nylon, and terminals 26 may have barbed projections for permanent seating inside terminal block 18.

Connector 19 has a first set of contact pins 51-59 projecting from a first face 101 (220 volt side) and a second set of contact pins 61-69 projecting from a second face 102 (440 volt side). The two sets of contact pins 51-59 and 61-69 are arranged for selective alternative engagement with female terminals 26 installed within apertures 41-49 respectively. Faces 101, 102 are interconnected by four edges 111-114 (FIG. 10).

The internal construction of connector 19 is illustrated in FIGS. 5-11. It includes seven pin assemblies 81-87 partially encapsulated within insulating base 100. Connector 19 is conveniently and cheaply fabricated by securing pin assemblies 81-87 in an appropriate jig and then casting insulating base 100 in place.

Pin assemblies 81-87 are of three general types, as illustrated in FIGS. 5-8. The first type, as illustrated by pin assembly 82 of FIG. 5 includes three pins 52, 58, 62 electrically interconnected and arranged such that pins 52, 58 project from the 220 volt side and pin 62 projects from the 440 volt side. Pins 52, 62 are in mechanical alignment and function as power delivery pins. Power is received by means of a depending flange 106 arranged for receiving a screw 92 (FIG. 10) which grips power lead 72. Pin assemblies 81, 83 are similar to pin assembly 82 but have right and left hand depending flanges 105, 107 for electrical connection with power leads 71, 73.

Edges 111, 112, 113 are provided with recesses 95, 96, 97 for protecting power leads 71-73 against accidental detachment, short or ground. It will be understood that the direction of motor rotation may be reversed by interchanging the connections of any two of the power leads.

Pin assemblies 85-87 are of identical construction, pin assembly 85 being illustrated in detail in FIG. 6. That pin assembly includes two pins 64, 67 which are electrically connected at their bases. Pin assemblies 85-87 project from the 440 volt side of connector 19, as illustrated in FIG. 9. These pin assemblies cause field windings 20-25 to become joined as three series connected pairs.

Pin assembly 84 has three interconnected pins 54-56 and projects from the 220 volt side of connector 19, as illustrated in FIG. 8. This pin assembly provides a parallel star connection for field windings 20, 23, 25.

Figure 12:
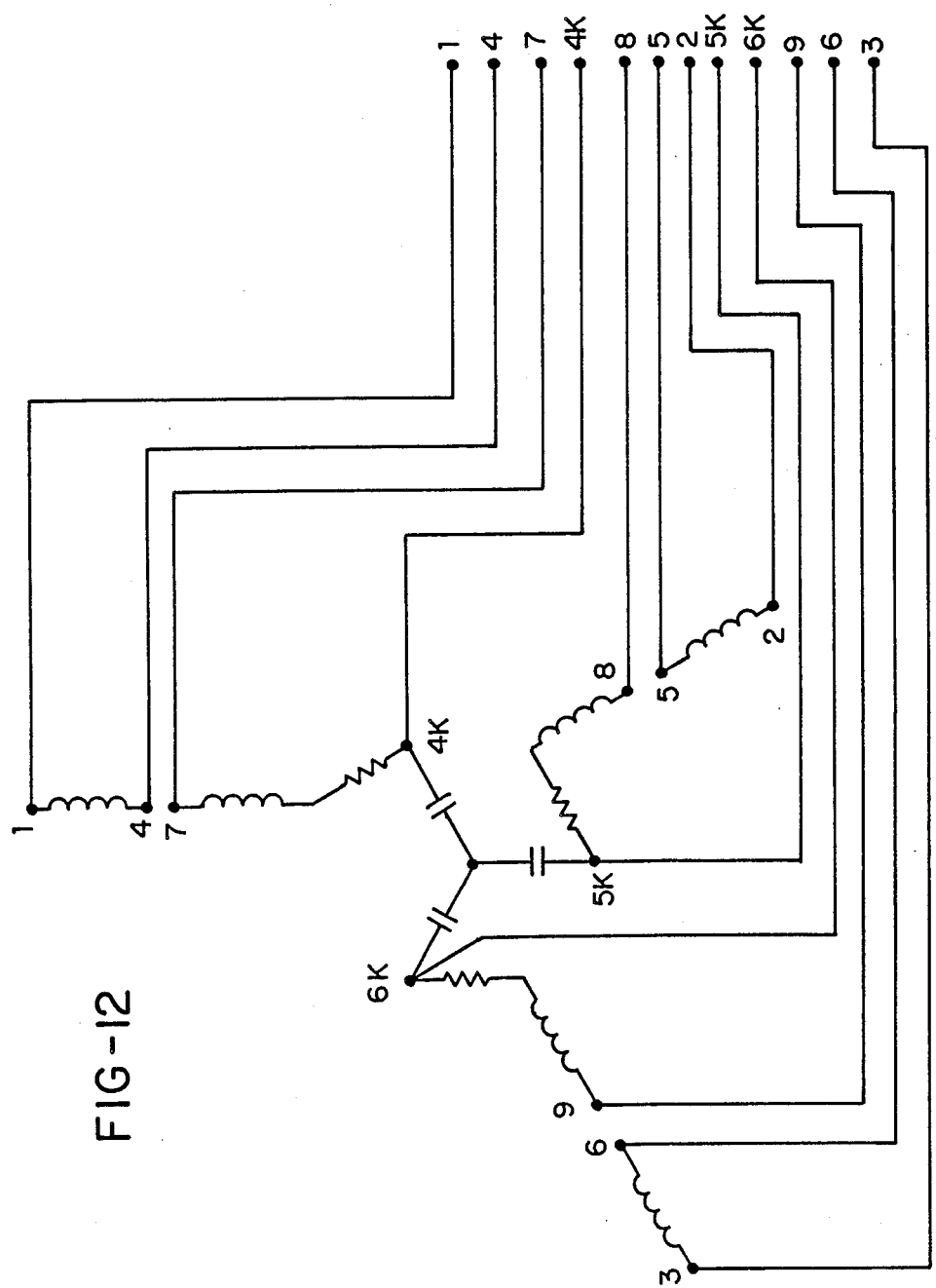
FIG. 12 is a schematic illustration of field windings for a three phase motor arranged in a star configuration and equipped with an overload circuit.

In an alternative embodiment the reversible connector of the present invention may appear as illustrated in FIGS. 13-15 for connection to a three phase star connected electric motor equipped with an overload circuit. Internal motor connections for such an arrangement are as illustrated in FIG. 12. Such a motor has nine lead wires 1-9 corresponding to lead wires 1-9 of FIG. 1. Additionally, the arrangement of FIG. 12 has three lead wires, designated 4K, 5K and 6K associated with the overload circuit. Overload circuits as illustrated in FIG. 12 are commercially available from Texas Instruments, Inc. under the trademark KLIXON.

The lead wires illustrated in FIG. 12 are connected to an array of twelve female terminals mounted in a terminal block (not illustrated). That terminal block in turn receives a reversible connector 201 as illustrated in FIGS. 13 through 15. Reversible connector 201 is configured in a manner similar to reversible connector 19, execpt that there are three additional contact pins on the 220 volt side.

FIG. 13 illustrates the 440 volt side of reversible connector 201. That side has nine contact pins designated on FIG. 13 by reference numerals 1-9 corresponding to the lead wires 1-9 of FIG. 12 to which connections are respectively made. Connections within reversible connector 201 for 440 volt usage are identical to the 440 volt connections for reversible connector 19. Those connections are shown for the central column of contact pins in FIG. 14. Connections for the remaining two columns of contact pins are similar to the connections illustrated in FIG. 14. Three phase electrical power is connected to contact pins 1, 2, 3. That power is supplied by power leads (not illustrated) attached to power connectors 202-204.

Electrical connections for the 220 volt side are as illustrated in FIGS. 14 and 15. These connections are similar to the 220 volt connections for the configuration of FIGS. 3-11, except for the three additional contact pins. Connections are made between pins 4 and 4K, 5 and 5K, and 6 and 6K.

It will be appreciated that power leads 71-73 could be incorporated into a cap configured for mating engagement with connector 19 opposite terminal block 18. Such a cap would take advantage of the interconnections between the power terminals on the opposite sides of connector 19. However, such a cap would add to the cost of the assembly. In a further embodiment of the invention power leads 71-73 could be connected directly to terminals 41-43 of terminal block 18. Such an arrangement would enable elimination of power pins 61-63 on the 440 volt side of connector 19.

While the forms of apparatus herein described constitute preferred embodiments of this invention, it is to be understood that the invention is not limited to these precise form of apparatus, and that changes may be made therein without departing from the scope of the invention which is defined in the appended claims.

What is claimed is:

1. For an electric motor having six field windings connected to nine terminal wires for selective application of three phase electrical power at either of two different voltage levels, improved voltage selection means comprising:
   a terminal block mounted on said motor and having an array of nine female terminals connected to said terminal wires, and
   a reversible connector comprising:
      an insulating base having oppositely disposed first and second faces interconnected by an edge surface,
      a first set of nine contact pins partially encapsulated within said base and projecting from said first face for selective engagement with said array of female terminals,
      a second set of nine contact pins partially encapsulated within said base and projecting from said second face for selective engagement with said array of female terminals, and
      three power connectors mounted on said base for reception of said power at either of said voltage levels;
      said power connectors each being connected to at least one pin in each of said first and second sets of contact pins; other pins in said first and second sets being setwise interconnected for applying said two different voltage levels to said motor.

2. The improved voltage selection means according to claim 1 wherein each of said power connectors is connected to pins in said first and second sets which are in mutual alingment.

3. The improved voltage selection means of claim 2 wherein said electric motor has its field windings interconnected in a star conriguration; the pins in said first set which are connected to power terminals each being connected to one other pin in said first set and the remaining three pins in said first set being separately connected so that said field windings are interconnected to define two parallel stars when said first set of pins are in engagement with said array of female connectors.

4. The improved voltage selection means of claim 3 wherein the six pins in said second set which are not connected to said power terminals are connected into three separate terminal pairs so that said field windings are interconnected to define a single star having two series connected windings in each arm when said second set of pins are in engagement with said array of female connectors.

5. The improved voltage selection means according to claim 2 wherein said female connectors are arranged in a plurality of aligned rows.

6. The improved voltage selection means according to claim 5 wherein said faces are rectangular and said edge surface defines four edges.

7. The improved voltage selection means according to claim 6 wherein said power connectors are mounted upon said edge surface.

8. The improved voltage selection means according to claim 7 wherein said power conneceters are each mounted upon a different one of said edges.

9. The improved voltage selction means according to claim 7 wherein said edges are recessed.

10. A reversible power connector for a three phase electric motor comprising:
    an insulating base having oppositely disposed first and second faces,
    a first set of nine (9) contact pins partially encapsulated within said base and projecting from said first face for selective engagement with an array of similarly arranged female terminals on said motor,
    a second set of nine contact pins partially encapsulated within said base and projecting from said second face for alternative selective engagement with said array of female terminals;
    three pins in said first set being connected to an in alignment with a corresponding pin in said second set for operation as power delivery terminals; the pins in said first and second sets being setwise interconnected for applying two different voltage levels to said female terminals.

11. The reversible power connector according to claim 10 said first and second faces being of rectangular configuration and joined by four edges, said apparatus further comprising three power connectors mounted upon at least one of said edges and electrically connected to siad power delivery terminals.

12. The reversible power connector according to claim 11 wherein the six pins in said second set other than the power delivery terminals are connected into three separate terminal pairs.

13. The reversible power connector according to claim 12 wherein the three power delivery terminals in said first set of contact pins are each connected to one other pin in said set, and the remaining three pins in said set are separately connected.

14. The reversible power connector according to claim 13 wherein the pins in both of said sets are arranged in generally aligned rows and columns.

15. The reversible power connector according to claim 14 wherein three of said edges are recessed and one of said power connectors is mounted in each of the recesses so defined.

16. For a star-connected electric motor having six field windings connected to nine terminal wires for selective application of three phase electrical power at either of two different voltage levels, improved voltage selection means comprising:
- a terminal block mounted on said motor and having an array of nine female terminals connected to said terminal wires, and
- a reversible connector comprising:
  - an insulating base having oppositely disposed first and second faces
  - a first set of nine contact pins partially encapsulated within said base and projecting from said first face for selective engagement with said array of female terminals
  - a second set of nine contact pins partially encapsulated within said base and projecting from said second face for selective engagement with said array of female terminals, and
  - means for applying three phase electrical power to three pins in each of said sets of contact pins; said first set of contact pins being interconnected so that upon engagement thereof with said array of female terminals said field windings are interconnected to define two parallel stars, and said second set of contact pins being interconnected so that upon engagement thereof with said array of female terminals said field windings are interconnected to define a single star having two series connected windings in each arm.

17. The improved voltage selection according to claim 16 wherein said power applying means comprises three power connectors mounted on said base.

18. For an electric motor having six field windings connected to nine lead wires for selective application of three phase electrical in either of two different voltage levels, improved voltage selection means comprising:
- a terminal block mounted on motor and having an array of nine female terminals connected to said lead wires, and
- a reversible connector comprising:
  - an insulating base having oppositely disposed first and second faces,
  - a first set of contact pins partially encapsulated within said base and projecting from said first face for selective engagement with said array of female terminals and interconnected such that said motor runs at a first one of said two different voltage levels when said first set of contact pins is engaged with said female terminals, and
  - a second set of contact pins partially encapsulated within said base and projecting from said second face for selective engagement with said array of female terminals and interconnected such that said motor runs at a second one of said two different voltage levels when said second set of contact pins is engaged with said female terminals.

19. The improved voltage selection means according to claim 18 wherein said first set of contact pins are interconnected to cause connection of said lead wires as follows:
- the first lead is connected to the seventh lead, the second lead is connected to the eighth lead, the third lead is connected to the ninth, the fourth, fifth and sixth leads are interconnected and said second set of contact pins are interconnected to cause connection of said lead wires as follows:
- the seventh lead is connected to the fourth lead, the eighth lead is connected to the fifth lead and the ninth lead is connected to the sixth lead.

20. The improved voltage selection means of claim 18 wherein said electric motor has an overload circuit and three lead wires associated therewith; at least one of said sets of contact pins comprising three contact pins for connection to said three lead wires.

* * * * *